July 22, 1941.   H. G. DOLL   2,249,751
ARRANGEMENT FOR MEASURING TEMPERATURES AT
A DISTANCE, PARTICULARLY IN BOREHOLES
Filed Dec. 27, 1937
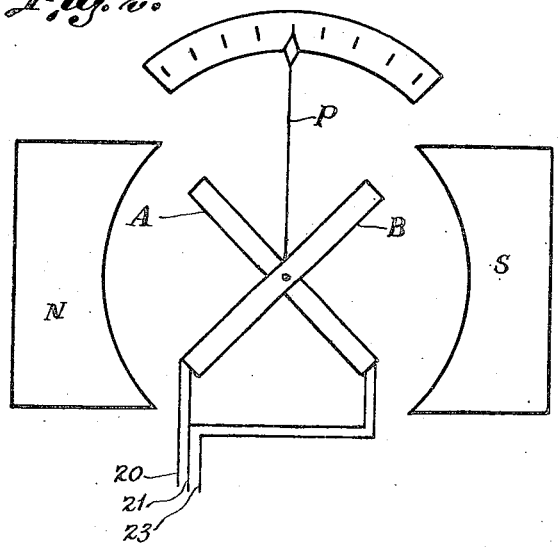
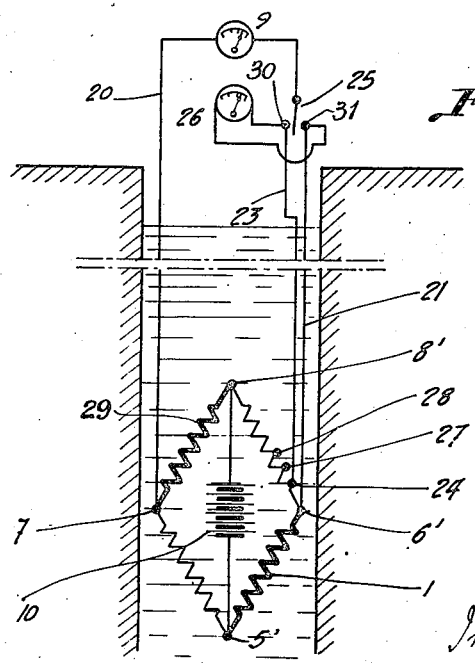

Patented July 22, 1941

2,249,751

UNITED STATES PATENT OFFICE 2,249,751

ARRANGEMENT FOR MEASURING TEMPERATURES AT A DISTANCE, PARTICULARLY IN BOREHOLES

Henri Georges Doll, Paris, France, assignor, by mesne assignments, to Schlumberger Well Surveying Corporation, Houston, Tex., a corporation of Delaware Application December 27, 1937, Serial No. 181,879
In France January 7, 1937

6 Claims. (Cl. 73—362)

The present invention relates to arrangements for measuring temperatures at a distance, especially in bore holes, and it relates more particularly to arrangements of this kind making use of the variation of resistance under temperature variations of certain materials, particularly alloys such as certain ferro-nickels.

In the current practice, it is customary to employ a resistance thermometer for obtaining indications of temperatures in relatively inaccessible places, such as bore holes, for example. In general, the thermometric element is lowered to the desired depth in the bore hole on an insulated two conductor cable, and the element and the two conductors in the cable constitute one of the arms of a Wheatstone bridge located at the surface of the earth.

As a practical matter, the cable is wound on a winch at the surface so that the thermometric element may be raised and lowered in the bore hole, and the connections between the ends of the conductors in the cable and the Wheatstone bridge are usually made through conventional slip rings and brushes.

Experience has demonstrated that the apparatus briefly described above is not entirely satisfactory because of errors introduced by variations in the contact resistance of the slip rings and brushes used and by variations in the resistance of the cable conductors resulting from variations in temperature at different depths in the bore hole.

The object of the present invention is to overcome these disadvantages, at least to a partial extent. For this purpose it consists essentially in placing at least one of the corners of the Wheatstone bridge in the neighbourhood of the place where the temperature measurements are to be made, and, particularly in the case of a bore hole, inside the bore hole itself in the neighbourhood of the place where the thermometric element proper is placed.

In accordance with a preferred embodiment of the invention, the whole Wheatstone bridge is located in the neighbourhood of the place where the temperatures are to be measured, that is to say for example inside the bore hole itself. In this case not only are the errors due to the resistance variations of the cable conductors suppressed, but also the errors due to the variation of resistance of the contacts between slip-rings and brushes, since neither the leads nor the contacts form any part of the arms of the Wheatstone bridge.

For a better understanding of the invention, reference is made to the accompanying drawing in which:

Fig. 1 is a schematic diagram of apparatus constructed according to the invention for obtaining indications of temperature in a bore hole; and Fig. 2 is a schematic diagram of apparatus for obtaining indications of the ratio of two potentials, which may be used in the embodiment shown in Fig. 1.

In the embodiment shown in Fig. 1 a Wheatstone bridge including two thermometric elements 1 and 29 is lowered into the bore hole to the depth or level at which the temperature indications are to be obtained. The terminals of the element 1 constitute the corners 5' and 6' of the bridge and the terminals of the element 29 constitute the terminals 7' and 8' of the bridge.

The arms 5'—7' and 6'—8' of the bridge comprise resistance elements made of an alloy whose resistivity does not vary with temperature such as constantan or manganin, for example. The latter two arms may have the same electrical resistance R, for example, and thermometric elements 1 and 29 may have a resistance equal to R at a particular temperature $T_0$, which constitutes the reference temperature from which measurements are made. In the case of a bore hole, this temperature may be in the neighborhood of 50° C. which is substantially the average temperature encountered.

The Wheatstone bridge is energized by a source of electrical energy 10 which is also lowered into the bore hole and which is connected across the diagonal 5'—8' of the bridge. The corner 7' of the Wheatstone bridge is connected through an insulated conductor 20 to one terminal of a potential indicating instrument 9, located at the surface of the earth. The potential indicating instrument 9 is preferably of the recording type so that a continuous record of potential differences may be obtained as the bridge is lowered or raised in the bore hole. The other terminal of the instrument 9 is connected to the blade of a change over switch 25 which is adapted to be moved selectively into engagement with one of two switch contacts 30 and 31, respectively, which are connected to the conductors 23 and 21, respectively.

The conductor 21 is connected to the corner 6' of the bridge and the conductor 23 is connected to a point 24 on the resistance element constituting the arm 6'—8', which point may, under certain conditions, form another corner of the bridge, if desired, as set forth below. A second potential indicating instrument 26 is connected to the contacts 30 and 31 of the switch 25 in order that indications may be obtained which are proportional to the current flowing in the arm 6'—8' of the bridge. The resistances of the measuring instruments 9 and 26 should preferably be large with respect to the bridge resistances so that for all practical purposes, the intensity of the current flowing through the shunt circuits 20, 21 and 23 may be neglected.

In operation, let it be assumed that the blade of the switch 25 is connected to the contact 31 so that the potential indicating instrument 9 is connected across the diagonal 7'—6' of the bridge. The bridge is then lowered into the bore hole and the readings of the potential indicating instrument 9 are observed or recorded as the case may be.

When the thermometric apparatus is at the temperature $T_0$, for which the resistance of the elements 1 and 29 is equal to R, the measuring instrument 9 will read zero. When the thermometric apparatus is displaced in the bore hole the temperature will vary; the resistance of the elements 1 and 29 will likewise vary and this manifests itself by the passage of an electric current through the measuring instrument 9, or by the occurrence of a potential difference $\Delta V_a$ between the corners 6' and 7'. The measurement of one of these quantities, such as $\Delta V_a$, thus makes it possible easily to determine the temperature T of the elements 1 and 29. This potential difference $\Delta V_a$ in fact is as known a mere function of the temperature difference $T-T_0$ for a given value of the current intensity I passing through the diagonal 5'—8'. It is on the other hand proportional to this current intensity. In other words the relation between T and $\Delta V_a$ and I can be written:

$$\Delta V_a = I(T - T_0)$$

which gives:

$$T - T_0 = f\left(\frac{\Delta V_a}{I}\right)$$

in which $\Delta V_a$ and I are the quantities obtained by measurement.

The apparatus may be calibrated once and for all in manufacture by comparison with an ordinary thermometer by measuring $\Delta V_a$ at various temperatures for a given intensity of the current I passing through the diagonal 5'—8'. The curve $$T - T_0 = f\left(\frac{\Delta V_a}{I}\right)$$

being thus experimentally determined, the simultaneous measurement of $\Delta V_a$ and I in a bore hole makes it possible to deduce from such measurements the corresponding temperature T. Experience has moreover shown that the curve in question is practically a straight line, so that the above formula can be written:

$$T - T_0 = K \cdot \frac{\Delta V_a}{I}$$

in which K is a coefficient of constant value for each individual thermometric arrangement.

To simplify the measurements to be carried out it is possible to proceed in practice by sending through the diagonal 5'—8' a current of predetermined constant intensity I, so that the variations of T are directly given by the variations of $\Delta V_a$. It is sufficient for this purpose to choose a source of current 10 of constant E. M. F. sufficiently high to pass through the diagonal 5'—8' a current of constant and sufficient intensity I.

If it is then supposed that the switch 25 is set to connect the instrument 9 to the lead 23, the instrument 9 measures the potential difference between the points 7' and 24, that is between the two corners of a second Wheatstone bridge, of which the four corners are 5', 7', 8' and 24. The position of the point 24 on the resistance 8'—6' is so chosen that the temperature $T_1$ for which there is no difference of potential between 24 and 7', is sufficiently different from the temperature $T_0$ which has been defined above. In practice it is possible to choose $T_0$ for instance in the neighbourhood of 40° C. and $T_1$ in the neighbourhood of 70° C. Thus a second basis temperature is provided from which the measurements can be made. Now the nearer the measured temperatures are to the basis temperature, the more accurate the temperature measurements will be; accordingly the arrangement will provide satisfactory accuracy over a range of temperature about twice as large.

Obviously one or other position of the switch will be used according to whether the temperature to be measured is nearer to the temperature $T_0$ or to the temperature $T_1$.

The arrangement in question has a still further advantage. Where indications of the instrument 9 alone are obtained, it is assumed that the E. M. F. of the source of current remains constant and known. Now, it may occur that for some accidental reason this E. M. F. varies, giving rise to a corresponding variations in the intensity of current I passing through the diagonal 5'—8'. The formula $$T - T_0 = \frac{K_0 \Delta V_a}{I} \qquad (1)$$

shows that the temperature measurements given by $\Delta V_a$ are then wrong and the more so the more the temperature to be measured deviates from the basis temperature.

Now, the measurement of the potential difference $\Delta V_b$ between the points 6' and 24 which is carried out by means of the instrument 26 gives the value of I and thus makes it possible to calculate the value of $T - T_0$ accurately. The arm resistances (5'—7')+(7'—8') and (8'—6')+(6'—5') which terminate at the corners 5' and 8' are equal, since they each comprise a resistance R and a thermometric element and the two thermometric elements are at the same temperature. The currents which traverse them are therefore equal to each other. Now the sum of these currents is obviously equal to the current I which passes through the diagonal 5'—8'. The intensity of current in each arm of the bridge is therefore equal to $$\frac{I}{2}$$

If, then the known resistance between 24 and 6' is designated r, the potential difference $\Delta V_b$ measured by the instrument 26 is given by the formula $$\Delta V_b = \frac{Ir}{2}$$

from which is deduced $$I = \frac{2\Delta V_b}{r}$$

Putting this formula into the form of (1) above the result obtained is:

$$T - T_0 = \frac{K_0 r}{2} \times \frac{\Delta V_a}{\Delta V_b} = K_1 \times \frac{\Delta V_a}{\Delta V_b}$$

$K_1$ being a constant of the arrangement.

T—T₀ is thus given, whatever the value of the current I may be, by the value of $$\frac{\Delta V_a}{\Delta V_b}$$

Instead of measuring ΔV_a and ΔV_b separately by means of two measuring instruments, it is also possible by means of an arrangement in accordance with a further feature of the invention to measure directly the ratio of these two quantities by means of any apparatus of a known kind, as shown in Fig. 2. Apparatus of this type is also disclosed in prior Patent No. 2,206,863.

Referring to Fig. 2, the apparatus for obtaining indications of the ratio $$\frac{\Delta V_a}{\Delta V_b}$$

comprises a pair of coils A and B mounted in space quadrature and suspended in the magnetic field produced by a pair of permanent magnets N and S. It will be apparent that the position of the coil suspension is a function of the strength of the respective fields created by the coils A and B and it can be shown that the deflection of the pointer P of the coil suspension is a function of the ratio of the voltages applied to the coils A and B.

In order to measure the desired ratios directly, the conductors 20 and 21 are connected to the terminals of the coil B, for example, so that the potential difference existing across the diagonal 6'—7' of the bridge is impressed on it. In similar fashion, the conductors 23 and 21 are connected to the terminals of the coil A so that it has impressed on it the potential difference existing across the points 6', and 24 of the bridge.

When the instrument is thus connected, the deflection of the pointer P is a function of the ratio between the potential difference existing across the diagonal 6'—7' of the bridge and the potential drop across the points 6' and 24 of the bridge and is therefore proportional to the ratio $$\frac{\Delta V_a}{\Delta V_b}$$

Moreover, instead of a single shunt circuit 24—23 several shunt circuits can be provided coming from different points 27, 28 of the arm 6'—8' of the bridge. This makes it possible to have different basis temperatures T₀, T₁, T₂, T₃, etc., from which measurements may be effected as desired, thus providing greater accuracy of measurement for the reasons indicated above.

It is of course possible to provide numerous modifications to the various forms of apparatus described without departing from the scope of the invention.

What I claim is:

1. An arrangement for measuring temperatures at a distance, particularly in bore holes, comprising a thermometric element of which the resistance varies as a result of temperature variations, the element being lowered into the mud of the bore hole, three resistances electrically connected together and to the said element to form a Wheatstone bridge, at least one of the corners of the Wheatstone bridge being lowered into the bore hole to the immediate vicinity of the thermometric element, a source of current electrically connected to two opposite corners of the Wheatstone bridge, a plurality of instruments for measuring potential differences, and means for electrically connecting the said instruments at will each to two out of a group of points previously chosen on the Wheatstone bridge resistances, the said instruments being arranged to measure separately the potential differences subsisting between the points to which they are respectively connected.

2. Apparatus for obtaining indications of temperatures at a distance, particularly in bore holes, comprising a thermometric element whose resistance varies with temperature, three resistances electrically connected together and to the said element to form a Wheatstone bridge, at least one of the corners of the bridge being lowered into the bore hole to the immediate vicinity of the thermometric element, said bridge having an energizing diagonal and a plurality of different indicating diagonals corresponding to positions of equilibrium at widely different reference temperatures, a source of current electrically connected across the energizing diagonal of the bridge, means for providing indications of potential differences, and means for electrically connecting said indicating means selectively to said respective indicating diagonals, whereby the indicating means may be connected to the indicating diagonal corresponding to the reference temperature which is closest to the temperature being indicated.

3. Apparatus for obtaining indications of temperatures at a distance, particularly in bore holes, comprising a Wheatstone bridge, said bridge being lowered into bore hole and having in each alternate arm thereof a thermometric element whose resistance varies with temperature, and having an energizing diagonal and a plurality of different indicating diagonals corresponding to positions of equilibrium at widely different reference temperatures, a source of voltage disposed in the bore hole with the bridge, and electrically connected across the energizing diagonal thereof, means at the surface of the earth for providing indications of potential difference, and means for electrically connecting said indicating means selectively to said respective indicating diagonals, whereby the indicating means may be connected to the indicating diagonal corresponding to the reference temperature nearest to the temperature being indicated.

4. Apparatus for obtaining indications of temperatures at a distance, particularly in bore holes, comprising a Wheatstone bridge, said bridge being lowered into the bore hole and having in each alternate arm thereof a thermometric element whose resistance varies with temperature, and having an energizing diagonal and a plurality of different indicating diagonals corresponding to positions of equilibrium at widely different reference temperatures, a source of current disposed in the bore hole with the bridge, and electrically connected across the energizing diagonal thereof, potential indicating means for providing indications of the potential difference across two points on one of the arms of the Wheatstone bridge, second potential indicating means at the surface of the earth, and means for connecting said second potential indicating means selectively to said respective indicating diagonals of the bridge.

5. Apparatus for obtaining indications of temperature in a bore hole, comprising a thermometric element whose resistance varies with temperature, said element being lowered into the bore hole, a plurality of electrical resistances electrically connected to each other and to said element to form a Wheatstone bridge, at least one of whose apices is lowered into the bore hole with the thermometric element, said bridge having an energizing diagonal and at least one indicating diagonal, a source of electrical energy connected across said energizing diagonal, and electrical indicating means located at the surface of the earth, said indicating means being connected across said indicating diagonal and to at least one other point on one of the arms of the bridge.

6. Apparatus for obtaining indications of temperature in a bore hole, comprising a thermometric element whose resistance varies with temperature, said element being lowered into the bore hole, a plurality of electrical resistances electrically connected to each other and to said element to form a Wheatstone bridge, at least one of whose apices is lowered into the bore hole with the thermometric element, said bridge having an energizing diagonal and at least one indicating diagonal, a source of electrical energy connected across said energizing diagonal, and potential indicating means electrically connected to the bridge for providing directly the ratio between the potential difference existing across said indicating diagonal and the potential drop between two points on one of the arms of the bridge.

HENRI GEORGES DOLL.